M. F. STUPAR.
DRIVING MECHANISM FOR FLYING MACHINES.
APPLICATION FILED JULY 30, 1919.

1,357,260.

Patented Nov. 2, 1920.
2 SHEETS—SHEET 1.

Inventor
Maximillian F. Stupar
by Parker & Stocknow
Attorneys

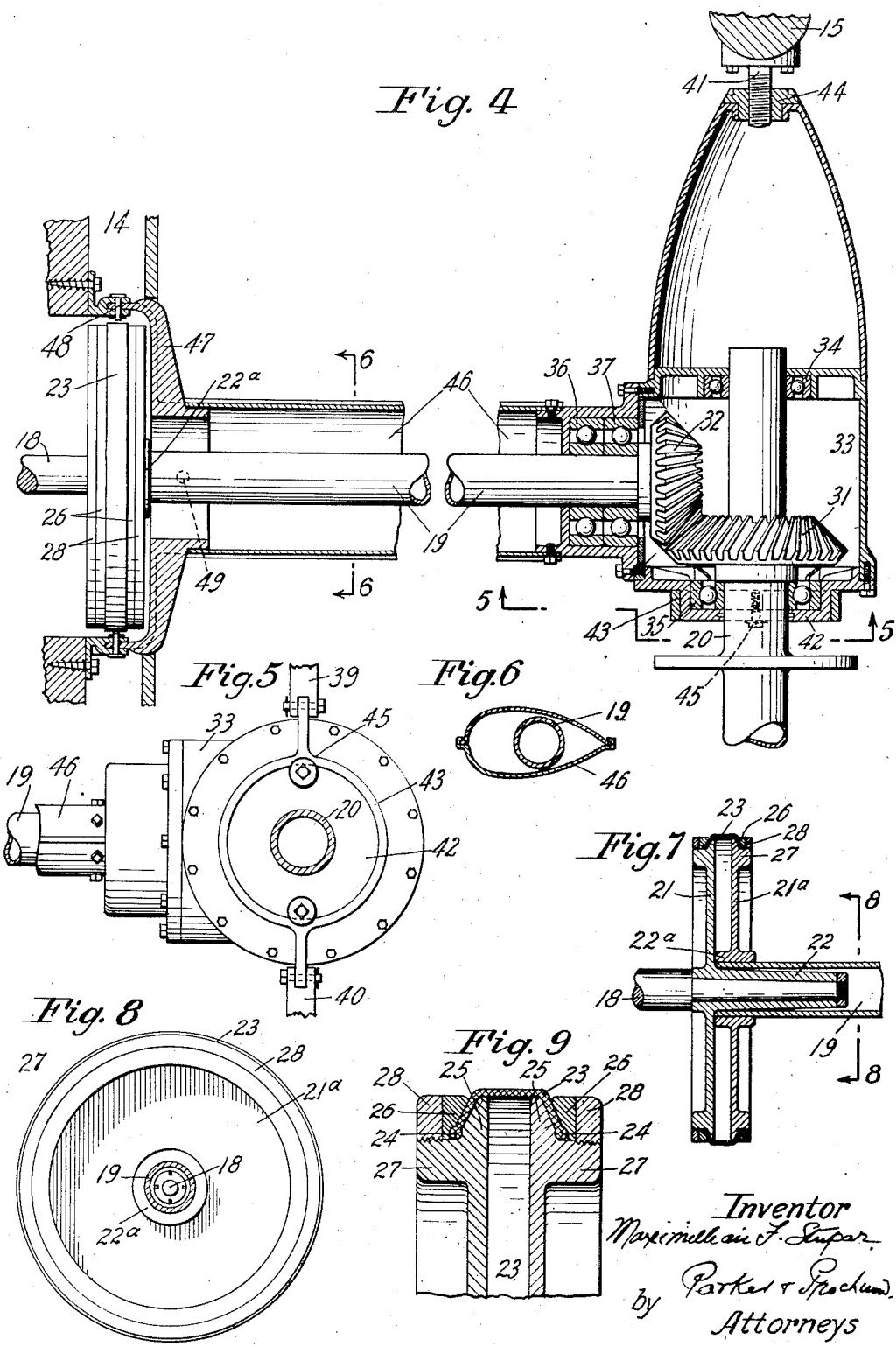

UNITED STATES PATENT OFFICE.

MAXIMILLIAN F. STUPAR, OF BUFFALO, NEW YORK, ASSIGNOR TO ABRAHAM J. ELIAS, OF BUFFALO, NEW YORK.

DRIVING MECHANISM FOR FLYING-MACHINES.

1,357,260. Specification of Letters Patent. Patented Nov. 2, 1920.

Application filed July 30, 1919. Serial No. 314,293.

*To all whom it may concern:*

Be it known that I, MAXIMILLIAN F. STUPAR, a citizen of the United States, residing at Buffalo, in the county of Erie and State of New York, have invented a new and useful Improvement in Driving Mechanisms for Flying-Machines, of which the following is a specification.

This invention relates to improvements in the propelling or driving mechanisms of flying machines and is applicable both to heavier than air and lighter than air flying machines.

Heretofore it has been thought impractical to locate the propeller of a flying machine at any considerable distance from its driving motor and ordinarily the motor has been located close to the propeller and the latter connected directly to the motor shaft. In flying machines having two or more motors and propellers, this construction has necessitated the location of the motors in positions where they are so inaccessible as to preclude attention and repairs during flights which would be readily possible with motors accessibly located in the body or fuselage of the machine. Notwithstanding the recognized advantages incident to the location of the motors in the body of the machine, such an arrangement has not been heretofore adopted practically for multiple propeller machines, owing to serious practical objections to the previous mechanisms for transmitting motion from the motors to the distantly located propellers. Among such objections may be stated the following: The excessive weight of the transmission mechanism which offsets the advantages gained by the location of the motors in the body remote from the propellers; the impossibility of the transmission mechanisms to adjust themselves to the various degrees of misalinement in the parts caused by the elongation of the truss stays for the airplane wings or the unstable nature of the supports for the transmission mechanism; the lack of dependability due to heating and fatigue in the gears of the mechanism, caused by the high velocity at which they revolve; the pulsating or intermittent nature of the gasolene motor power, and the misalinement of the transmission gears; the excessive loss of power due to the multiplicity of gears, bearings, etc.; and the breaking of the motor crank shaft resulting from the stresses due to misalinement caused by the elongation of the truss stays for the wings of the machine or other causes.

One of the objects of this invention is to produce a practical and efficient construction and arrangement for the driving or propelling mechanism of flying machines which enables a plurality of motors to be located in readily accessible positions in the body or fuselage of the machine and provides a transmission mechanism between the motors and distant propellers which avoids the above noted objections, is of the minimum weight and contains the minimum number of gears, length of shafting, bearings and accessory parts.

Other objects of the invention are to provide a transmission mechanism between the motors and propellers including a combined fly wheel and flexible coupling of novel construction which will permit of a considerable misalinement and relative movement in any direction of the shafts connected thereby, will prevent the transmission of all shocks from the motor to the gears of the transmission, and will translate the pulsating or intermittent power of the motor to a continuous, even motion and torque on the propeller and enable the motor to be operated at relatively low speeds without depending upon the fly wheel effect of the propeller; also to provide a flexible mounting or support for the transmission mechanism which will prevent stress due to misalinement or distortion of the parts from being transmitted to the motor, gears or other power transmission unit; and also to improve the construction and arrangement of the propelling mechanisms for flying machines in the other respects hereinafter described and set forth in the claims.

In the accompanying drawings:

Fig. 4 is a sectional plan view on an enlarged scale, of the transmission mechanism between the propeller and motor shafts, and the housing therefor.

Fig. 5 is a front elevation thereof partly in section, on liine 5—5, Fig. 4.

Fig. 6 is a sectional elevation thereof on line 6—6, Fig. 4.

Fig. 7 is a sectional elevation, on an enlarged scale, of the combined fly wheel and flexible coupling.

Fig. 8 is a transverse sectional elevation thereof on line 8—8, Fig. 7.

Fig. 9 is an enlarged section of the peripheral portion of the fly wheel and flexible coupling.

Figure 1:
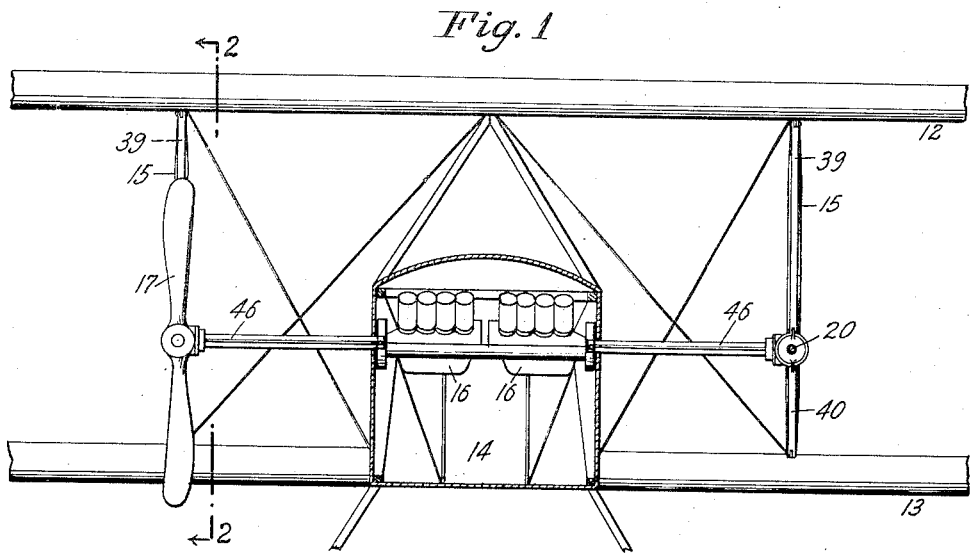
Figure 1 is a fragmentary front elevation, partly in section, of an airplane provided with propelling mechanism embodying the invention.
Figure 2:
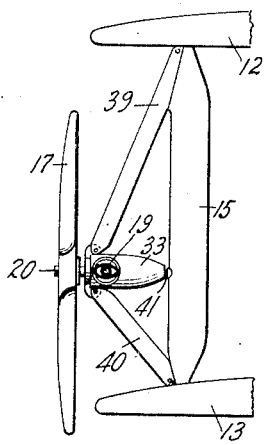
Fig. 2 is a sectional elevation thereof on line 2—2, Fig. 1.
Figure 3:
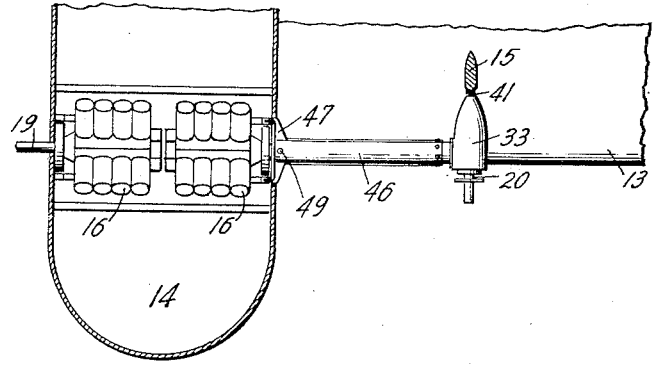
Fig. 3 is a fragmentary sectional plan view thereof.

In this application the invention is disclosed as applied to an airplane. 12 and 13 represent the upper and lower planes or wings of the airplane and 14 the body or fuselage thereof. The wings or planes are connected by vertical struts 15 and wire truss-stays. These parts may be of the usual or any suitable construction. 16, 16 represent two motors for driving the two propellers of the machine, one of which is shown at 17. These motors are arranged in the body or fuselage at an angle to the direction of flight of the machine, the motors, as shown, being arranged in alinement, end to end, crosswise in the body. The two motors are connected to their respective propellers by transmission mechanisms which are alike except that they are oppositely arranged, one right and one left. A description of one transmission mechanism will suffice for both. The transmission mechanism is preferably constructed as follows:

18 represents the main or crank shaft of the motor and 19 an intermediate shaft between the crank shaft and the propeller shaft 20. The intermediate shaft 19 is arranged in alinement or substantial alinement with the motor shaft and extends horizontally transversely of the machine. These two shafts are connected by a combined flexible coupling and fly wheel which is preferably constructed as follows, see Figs. 7–9: 21 and 21$^a$ represent respectively two substantially parallel circular disks, one rigidly fixed to the outer end of the motor shaft 18, and the other fixed to the adjacent or inner end of the intermediate shaft 19. Preferably the disk 21 is provided with a long hub 22 which is rigidly secured by a nut or otherwise on the tapered end of the motor shaft and this hub, which is tapered exteriorly, extends into the shaft 19, which is tubular. The other disk 21$^a$ is rigidly secured in any suitable way on the end of the hollow shaft 19 and the hub 22$^a$ of this disk has a rounded or spherical inner end adapted to bear and rock against the opposite disk 21. The peripheral portions of the two coupling disks 21 and 21$^a$ are connected by an elastic flexible rim or annulus 23, preferably of soft or pliable rubber, which is fixedly clamped or secured at its opposite edges to the two disks. Preferably the elastic coupling rim or annulus is provided with beaded opposite edges 24 which are bent inwardly over outwardly extending circumferential flanges 25 on the disks 21 and 21$^a$ and are clamped against these flanges by opposing clamping rings 26 which surround outwardly projecting flanges 27 on the disks and are forced into holding engagement with the elastic rim by nuts 28 which are screwed on the threaded outer ends of the flanges 27 at the outer sides of the clamping rings. The elastic rim or annulus connecting the two coupling disks is thus located at the extreme peripheral or circumferential portion of the disks, where it will transmit the maximum power for a given weight and strength of the rim, and is continuously attached throughout the extent of its opposite edges to the two coupling disks. While the elastic rim is thus very securely and rigidly attached to the two disks, it nevertheless can be readily attached and detached, thus permitting the ready renewal of the rim. This elastic rim causes the two disks of the coupling and the connected shafts to rotate together but permits slight movements of the disks and shafts relative to each other endwise, rotatably and angularly, and transmits motion resiliently from one shaft to the other so that the driven shaft has a continuous, even motion and torque notwithstanding the pulsating nature of the movement of the motor shaft. The driven shaft can thus assume positions more or less out of alinement with the motor shaft and turn and move endwise somewhat relative thereto so as not to transmit harmful strains or stresses from one shaft to the other. The relatively large mass of material in the elastic rim traveling at a high velocity will dampen all the more sudden shocks, so that no vibration will be transmitted in either direction past this coupling.

The propeller shaft 20 is connected at its inner end to the outer end of the intermediate shaft 19 by bevel gear wheels 31, 32 fixed in any suitable manner to said shafts. The teeth of these bevel wheels are preferably cut obliquely or at an angle to the pitch line of the gears so that the teeth mesh with a sliding or rocking action like that of the teeth of spiral gears and thus produce a continuous smooth action of the gears free from the knocking or hammering incident to the radial arrangement of the teeth of ordinary bevel gears. The ends of the shafts 19 and 20 extend into and are journaled in a support 33 which is preferably hollow and forms an inclosing housing for the bevel gears. The propeller shaft 20 is preferably journaled in two ball bearings 34 and 35 mounted in the housing 33 at opposite sides of the bevel gear 31, and the intermediate shaft 19 is journaled in ball bearings 36 and 37 mounted in the housing at the outer side of the bevel gear 32. These ball bearings may be of any suitable construction but are preferably of the well known combined radial and end-thrust type.

The gear housing 33 is arranged horizontally, fore and aft of the machine, or in the direction of flight, and is mounted so that it and all of its contained mechanism can move or shift a limited extent in relation to the motor, which is fixed in location. Preferably the housing is mounted as shown, between the wing strut 15 and the upper and lower braces 39 and 40, which are hinged at their ends to the upper and lower ends of the strut, the housing thus forming in effect the strut of a truss formed by the wing strut and the braces 39, 40. The rear end of the gear housing is supported and adapted to turn on a stud 41 which is fixed to and projects forwardly from the wing strut 15, and the forward end of the housing is provided with a cylindrical bearing or extension 42 which is rotatably supported in a ring 43 hinged to the adjacent ends of the braces 39, 40. The stud 41 is screwthreaded and a nut 44 screwed thereon has a cylindrical bearing portion entering a circular socket in the rear end of the gear housing. This nut can be turned on the stud to force the gear housing against the braces and firmly secure the housing between the wing strut and the braces while nevertheless permitting a slight turning movement of the housing about its horizontal axis on its support. The supporting ring 43 for the front end of the gear housing can be secured to the housing by any suitable means, such, for instance, as screws 45, Figs. 4 and 5, provided with washers which overlap the end of the supporting ring. The usual connections of the ends of the strut 15 with the upper and lower wings also makes possible a slight horizontal swinging of the housing about the strut connections as a center.

In order that all stresses due to misalinement between the gear housing 33 and the motor, which has a fixed position, shall be concentrated at a point coincident with the center of the elastic driving rim of the coupling 21, 21ª, and in order to prevent unnecessary stresses in the bearings, a tubular spreader 46 surrounds the intermediate shaft 19 between the gear housing 33 and the body or fuselage 14 of the machine. This spreader which is preferably of stream line form in cross-section, is rigidly attached in any suitable way to the gear housing 33 and is provided at its inner end with a spider 47 having hinge connections 48 with the body or fuselage of the machine. The tubular spreader 46 is also loosely connected to the spider 47, as by pivots 49 arranged perpendicularly to the hinge connections 48, so as to permit a limited horizontal flexure of the spreader and gear housing.

The transmission mechanism above described will operate satisfactorily under conditions, such as prevail in flying machines, where there is apt to be a continual changing in the location of the propeller or driven element with respect to the motor or source of power, and will give a uniform torque at the driven element although the source of power may be of a pulsating or non-uniform nature. The gearing can also operate at high velocities which would otherwise be impossible where the power is intermittent or where misalinement, such as due to slight flexure of a shaft, cannot be prevented.

By arranging the motor crosswise or at an angle to the line of flight and constructing the transmission mechanism as described, one set of bevel gears with the necessary bearings and housing, and a considerable length of shafting are eliminated, thus materially reducing the weight of and simplifying the mechanism. The elimination of these parts also greatly reduces the loss in power. By utilizing the flexible coupling as a fly-wheel, the motor can be operated at very low speeds without depending upon the fly-wheel effect of the propeller.

While the preferred embodiment of the invention has been shown and described in detail, the invention is not limited to this particular construction. Furthermore, less or more than two motors can be used, either arranged at right angles to the direction of flight, as shown, or at other angles thereto, with the consequent changes in the mechanism.

I claim as my invention:

1. In a flying machine, the combination of a motor and its shaft, a propeller shaft extending at an angle to the motor shaft, and transmission mechanism connecting said motor and propeller shafts and including a combined flexible coupling and fly wheel.

2. In a flying machine, the combination of wings, an upright strut for said wings, a fuselage, a motor and its shaft mounted in said fuselage, a propeller shaft, an intermediate shaft flexibly connected to said motor shaft, gear wheels connecting said propeller shaft and said intermediate shaft, and a support for said gear wheels, said support being flexibly mounted on said strut.

3. In a flying machine, the combination of a motor and its shaft, a propeller shaft, an intermediate shaft alined with said motor shaft, driving connections between said intermediate and said propeller shafts, and a universal and flexible coupling connecting said motor shaft and said intermediate shaft, whereby universal angular movement of one of said last named shafts relatively to the other and lengthwise movement of one of said shafts relatively to the other is permitted.

4. In a flying machine, the combination of a motor arranged with its drive shaft at an angle to the direction of flight of the machine, a propeller having its axis extending substantially in the direction of flight, transmission mechanism connecting said motor shaft and propeller, and having an elastic connection which transmits motion resiliently from the motor to the propeller, and a flexibly mounted support for said transmission mechanism.

5. In a flying machine, the combination of a motor arranged with its drive shaft at an angle to the direction of flight of the machine, a propeller shaft extending substantially in the direction of flight, an intermediate shaft, a universal elastic coupling connecting said intermediate shaft to one of said other shafts, intermeshing gear wheels connecting said intermediate shaft to the remaining shaft, and a flexibly mounted support in which said gear wheels are journaled in fixed relation to each other.

6. In a flying machine, the combination of a motor arranged with its drive shaft at an angle to the direction of flight of the machine, a propeller shaft extending substantially in the direction of flight, an intermediate shaft, an elastic coupling connecting said motor and intermediate shafts, bevel gears connecting said intermediate and propeller shafts, and a flexibly mounted support in which said bevel gears are journaled in fixed relation to each other.

7. In a flying machine, the combination of a motor arranged with its drive shaft at an angle to the direction of flight of the machine, a propeller shaft extending substantially in the direction of flight, an intermediate shaft, a flexible coupling connecting said motor and intermediate shafts, bevel gears connecting said intermediate and propeller shafts, and a support in which said bevel gears are mounted and which is movably mounted to have a limited movement about the axis of said propeller shaft and angularly relative to said motor shaft.

8. In a flying machine, the combination of a motor and its shaft, a propeller shaft extending at an angle to the motor shaft, an intermediate shaft flexibly connected to the motor shaft, intermeshing gear wheels connecting said intermediate and propeller shafts, and a support in which said gear wheels are mounted and which is movably mounted to have a limited movement about the axis of the propeller shaft and angularly relative to said motor shaft.

9. In a flying machine, the combination of a motor and its shaft, a propeller shaft extending at an angle to the motor shaft, an intermediate shaft flexibly connected to the motor shaft, bevel gears connecting said intermediate and propeller shafts, a flexibly mounted support in which said bevel gears are mounted, and a distance member connected at one end to said support and flexibly mounted at its opposite end adjacent to the flexible connection between said motor and intermediate shafts.

10. In a flying machine, the combination of a motor and its shaft, a propeller shaft extending at an angle to the motor shaft, an intermediate shaft flexibly connected to the motor shaft, bevel gears connecting said intermediate and propeller shafts, a support for said motor, a flexibly mounted support in which said bevel gears are mounted, and a hollow distance member which surrounds said intermediate shaft, is connected at one end to said gear support and is flexibly connected at its opposite end to said motor support.

11. In a flying machine, the combination of wings, a vertical strut for said wings, a motor and its shaft, a propeller shaft extending at an angle to the motor shaft, an intermediate shaft flexibly connected to the motor shaft, intermeshing gear wheels connecting said intermediate and propeller shafts, and a support for said gear wheels mounted on said strut to have a limited movement about the axis of the propeller shaft and angularly relative to said motor.

12. In a flying machine, the combination of a motor and its shaft, a propeller shaft extending at an angle to the motor shaft, and transmission mechanism connecting said motor and propeller shafts and including a combined flexible coupling and fly wheel comprising substantially parallel circular disks and an elastic flexible rim secured to the peripheral portions of said disks.

13. In a flying machine, the combination of a motor and its shaft, a propeller shaft extending at an angle to the motor shaft, and transmission mechanism connecting said motor and propeller shafts and including a shaft substantially in alinement with said motor shaft, and a combined flexible coupling and fly wheel comprising circular disks secured to said motor and alined shafts, and an elastic flexible rim secured to the peripheral portions of said disks.

14. In a flying machine, the combination of a motor and its shaft, a propeller shaft, an intermediate shaft, gears connecting the end of said intermediate shaft with said propeller shaft, flexible and universal connection between said intermediate shaft and said motor shaft, and a flexibly mounted support for the connected ends of said intermediate and said propeller shafts.

Witness my hand, this 26th day of July, 1919.

MAXIMILLIAN F. STUPAR.

Witnesses:
  M. LAFFERTY,
  L. WERNER.